(12) United States Patent
Anglin et al.

(10) Patent No.: US 10,565,242 B2
(45) Date of Patent: Feb. 18, 2020

(54) METHOD OF LABEL TRANSFORM FOR MANAGING HETEROGENEOUS INFORMATION

(71) Applicant: International Business Machines Corporation, Armonk, NY (US)

(72) Inventors: Debbie A. Anglin, Leander, TX (US); Su Liu, Austin, TX (US); Andrew Ly, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 15/403,068

(22) Filed: Jan. 10, 2017

(65) Prior Publication Data

US 2018/0196872 A1 Jul. 12, 2018

(51) Int. Cl.
 *G06F 16/33* (2019.01)
 *G06N 20/00* (2019.01)

(52) U.S. Cl.
 CPC ......... *G06F 16/3346* (2019.01); *G06N 20/00* (2019.01)

(58) Field of Classification Search
 CPC . G06F 17/30684; G06F 21/10; G06N 99/005; H04L 67/12; H04L 63/08; H04L 63/0823
 See application file for complete search history.

(56) References Cited

U.S. PATENT DOCUMENTS

| | | | |
|---|---|---|---|
| 6,799,085 B1 * | 9/2004 | Crisp, III | B67D 1/0057 222/146.6 |
| 7,383,320 B1 * | 6/2008 | Silberstein | G06F 17/3089 707/E17.116 |
| 7,754,025 B1 * | 7/2010 | Crisp, III | B67D 1/0057 134/56 D |
| 8,219,608 B2 | 7/2012 | alSafadi et al. | |
| 8,442,042 B2 | 5/2013 | McCoy | |

(Continued)

FOREIGN PATENT DOCUMENTS

| | | |
|---|---|---|
| CN | 104748504 A | 7/2015 |
| WO | 201211647 A1 | 1/2012 |

OTHER PUBLICATIONS

U.S. Appl. No. 62/433,111. Related to U.S. Pat. No. 9,818,007 to Bajovic. Attached as "62/433,111,Specification,2016-12-12.pdf" (Year: 2016).*

(Continued)

*Primary Examiner* — James Trujillo
*Assistant Examiner* — Michal Bogacki
(74) *Attorney, Agent, or Firm* — Patterson + Sheridan, LLP (57) ABSTRACT

Techniques are disclosed herein for normalizing heterogeneous information provided in labels processed by Internet of Things (IoT) devices. A device (e.g., an IoT-enabled device) receives an item including label content. The label content includes attributes describing the item. The device determines that at least one of the attributes is not formatted for processing by the device. A request is generated to format the attributes for processing. The request includes the label content and a target language and a target encoding. The request is sent to a network service that translates the label content. The device receives the translated label content from the network service and processes the item according to the translated label content.

20 Claims, 6 Drawing Sheets

(56) References Cited

U.S. PATENT DOCUMENTS

| | | | |
|---|---|---|---|
| 9,000,896 B1 | 4/2015 | Kim et al. | |
| 9,098,888 B1* | 8/2015 | Lin | G06K 9/18 |
| 9,137,297 B2 | 9/2015 | Kim et al. | |
| 9,239,961 B1* | 1/2016 | Cole | G06K 9/00456 |
| 9,277,601 B2 | 3/2016 | Bandholz et al. | |
| 9,430,766 B1* | 8/2016 | Kraft | G06Q 20/352 |
| 9,576,196 B1* | 2/2017 | Natarajan | G06K 9/3258 |
| 9,613,100 B2* | 4/2017 | Lanier | G06F 17/30528 |
| 9,818,007 B1* | 11/2017 | Bajovic | G06Q 30/0631 |
| 9,959,271 B1* | 5/2018 | Goyal | G06F 17/2818 |
| 9,996,819 B1* | 6/2018 | Modi | G06Q 10/087 |
| 2001/0049846 A1 | 12/2001 | Guzzi et al. | |
| 2003/0046963 A1* | 3/2003 | Scheper | C11D 3/43 68/12.21 |
| 2007/0181663 A1* | 8/2007 | Bateman | G06Q 30/02 235/375 |
| 2007/0260750 A1* | 11/2007 | Feied | H04L 67/06 709/246 |
| 2009/0076795 A1* | 3/2009 | Bangalore | G06F 17/2785 704/9 |
| 2010/0169348 A1* | 7/2010 | Maro | G06F 16/24556 707/758 |
| 2011/0314163 A1 | 12/2011 | Borins et al. | |
| 2011/0320454 A1* | 12/2011 | Hill | G06F 17/30265 707/739 |
| 2014/0259441 A1* | 9/2014 | Fulmer | D06F 39/004 8/137 |
| 2014/0259448 A1* | 9/2014 | Alexander | D06F 33/02 8/137 |
| 2015/0081321 A1* | 3/2015 | Jain | G06F 19/3456 705/2 |
| 2015/0178293 A1* | 6/2015 | Chrysanthakopoulos | G06F 16/7837 701/410 |
| 2015/0286630 A1* | 10/2015 | Bateman | G06F 17/30241 704/9 |
| 2015/0312230 A1 | 10/2015 | Choi et al. | |
| 2016/0104125 A1* | 4/2016 | Chapman | G06Q 10/20 705/305 |
| 2016/0140217 A1* | 5/2016 | Sano | G06F 17/30654 706/12 |
| 2016/0364476 A1* | 12/2016 | Curin | G06F 17/30684 |
| 2017/0116679 A1* | 4/2017 | Abraham | G06Q 40/12 |
| 2017/0309136 A1* | 10/2017 | Schoner | G06Q 10/087 |

OTHER PUBLICATIONS

U.S. Patent Application entitled "Method of Label Transform for Managing Heterogeneous Information," U.S. Appl. No. 15/403,045, filed Jan. 10, 2017.

"Whirlpool Corporation, IBM Collaborate on Cognitive Solutions for Connected Appliances," PR Newswire, Jan. 6, 2016. [Available Online] http://www.prnewswire.com/news-releases/whirlpool-corporation-ibm-collaborate-on-cognitive-solutions-for-connected-appliances-300200163.html# [Accessed on Feb. 17, 2017].

"Washing Care Labels and Garment Care Symbols with Care Instructions." [Available Online] http://www.clothinglabel.com/content/washing-care-labels-and-garment-care-symbols-care-instructions [Access on Feb. 17, 2017].

Disclosed Anonymously. (2014) "Multi-language Cross Platform Content Sharing," ip.com Prior Art DTD. IPCOM000127080D.

Lloret, J., Macias, E. & Suarez, A. et al (2012). "Ubiquitous Monitoring of Electrical Household appliances," Sensors, 12 (11), 12159-15191.

"Laundry Care Label Checker" ISO & JIS, Dream Orbiter, Apr. 18, 2014. [Available Online] https://itunes.apple.com/is/app/laundry-care-label-checker/id473466192?mt=8 [Accessed on Feb. 17, 2017].

Intetek, "Caring About the Consumers Beyond the Label," 2016. [Available Online] http://www.intertek.com/uploadedFiles/Intertek/Divisions/Consumer_Goods/Media/PDFs/Services/Low%20Res%20CompleteCareLabelling.pdf [Accessed on Feb. 17, 2017].

"The Clothing, Lingerie and Apparel Dictionary," [Available Online] http://www.clothingdictionary.com/general_fabric_care_guide_htm [Accessed on Feb. 17, 2017].

* cited by examiner

METHOD OF LABEL TRANSFORM FOR MANAGING HETEROGENEOUS INFORMATION

BACKGROUND

The present disclosure relates to Internet of Things devices such as smart appliances, and more specifically, to normalizing heterogeneous information in labels processed by the IoT devices.

Internet of Things (IoT) is an approach that networks physical objects that are embedded with electronics, software, sensors, and the like that enables these objects to collect and exchange data. IoT devices are typically networked via a hub that allows messages to be sent back and forth between the hub and devices. Further, cloud computing platforms can provide multiple services for networked IoT devices, such as IoT service applications and cloud storage of collected data.

Common household appliances may implement IoT technology to improve a user experience for an individual. As an example, an IoT-based washing machine may collect data relating to clothes being loaded into the washing machine. To do so, the washing machine may be configured with sensors, such as a camera and an RFID reader, that scan labels provided with the clothing. As a result, the washing machine can automatically identify information associated with a given clothing item inserted into the washing machine, such as a clothing type, clothing color, care instructions, and the like. Based on the information, the washing machine can then automatically determine settings to perform relative to the clothing item, such as a minimum or maximum temperature that can be set, an amount of fabric softener to dispense, and the like.

One concern with appliances that scan such data from input items (like clothes in a laundry machine) is that a label accompanying a given item can differ significantly from a label of another similar item. For example, a shirt A can have a clothing label that is printed in English with instructions that use British units (e.g., Fahrenheit temperatures), whereas a shirt B can have a clothing label that is printed in Chinese with instructions that use metric units (e.g., centigrade temperatures). Further, the labels themselves may be provided with the clothing using different methods, such as through storing information in RFID tags, printing label information on the fabric directly, providing label information as a URL printed on the fabric, etc. Based on the variety of labels used for the items, the appliance might be unable to identify how to process a given item consistently.

SUMMARY

One embodiment presented herein discloses a method. This method generally includes receiving, by a device, an item including a label. Content of the label includes a plurality of attributes describing the item. It is determined that at least a first one of the plurality of attributes is not formatted for processing by the device. A request to format the first attribute for processing by the device is generated. The request includes the content, a target language, and a target encoding. The request is sent to a network service for translating the label content. Translated label content is received from the network service. The item is processed, by the device, according to the translated label content.

Another embodiment presented herein discloses a computer program product. The computer program product has a computer-readable storage medium storing instructions, which, when executed on a processor, performs an operation. The operation itself generally includes receiving, by a device, an item including a label. Content of the label includes a plurality of attributes describing the item. It is determined that at least a first one of the plurality of attributes is not formatted for processing by the device. A request to format the first attribute for processing by the device is generated. The request includes the content, a target language, and a target encoding. The request is sent to a network service for translating the label content. Translated label content is received from the network service. The item is processed, by the device, according to the translated label content.

Yet another embodiment presented herein discloses a system having a processor and a memory. The memory stores program code, which, when executed on the processor, performs an operation. The operation itself generally includes receiving, by a device, an item including a label. Content of the label includes a plurality of attributes describing the item. It is determined that at least a first one of the plurality of attributes is not formatted for processing by the device. A request to format the first attribute for processing by the device is generated. The request includes the content, a target language, and a target encoding. The request is sent to a network service for translating the label content. Translated label content is received from the network service. The item is processed, by the device, according to the translated label content.

DETAILED DESCRIPTION

Embodiments presented herein disclose techniques for managing a heterogeneous set of item information provided by items processed by a device, such as an Internet of Things (IoT) device. In particular, the techniques provide a label transform assistant service that may operate as a Software-as-a-Service (SaaS) on a cloud platform. The assistant service normalizes label data of an input item that is provided by an IoT device, such as an IoT-enabled washing machine. The assistant service may store the normalized information (as well as mappings of received label data to corresponding data in the normalized information) at a storage location, e.g., in the cloud platform.

Consequently, when a given IoT device receives an input item, such as a washing machine receiving a clothing item, the device may scan the label information from the item and determine whether the label information is recognizable by the IoT device, such as whether the language can be read by the IoT device, whether symbols printed on the label are identifiable by the IoT device, etc. If not, then the IoT device may package the label information and generate a request that includes the information. The IoT device may then send the request to the assistant service. In turn, the assistant service normalizes the label information to a standardized format. The standardized format allows the assistant service to translate the label information to a format that is readable according to user preferred settings and the type of the device, e.g., readable in a user-preferred language and formatted for a particular version of the IoT device. The assistant service may then send the translated label information to the IoT device, which in turn determines appropriate settings for processing the item according to the corresponding translated information.

Advantageously, the techniques disclosed herein disclose a framework for unifying numerous heterogeneous labels for similar items. The assistant service may use a number of machine translation techniques to identify, from on an input label, fields that correspond to a field of the standardized format (e.g., using some image conversion and/or machine translation techniques). The assistant service can then identify settings of an IoT device and format the normalized data for the device itself.

Note, the following discussion uses an IoT-enabled washing machine appliance as an example of an Internet of Things device that determines processing instructions based on label information provided by items processed by the device. However, one of skill in the art will recognize that embodiments described herein may be adapted to a variety of networked devices that process data that accompanies a given item of input. For example, an IoT-enabled refrigerator may scan food products inserted into the refrigerator to obtain, e.g., dietary and nutritional information associated with each food product. Embodiments may be adapted to the refrigerator such that the refrigerator scans a label (or other information) accompanying the food product and sends the data to the label transform assistant service. The assistant service may then normalize the data to a standardized format and translate the standardized data to a format that can be processed by the refrigerator.

Figure 1:
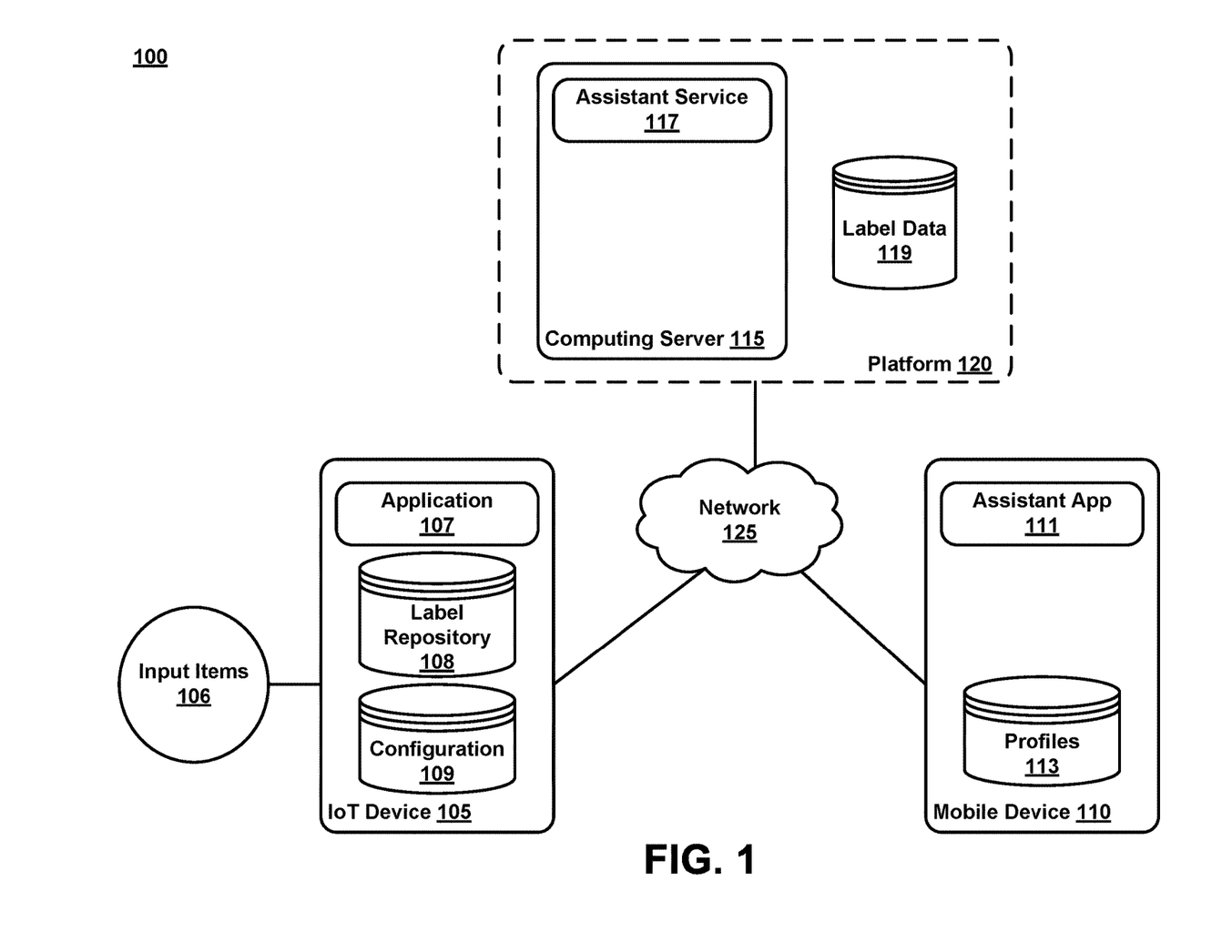
FIG. 1 illustrates an example computing environment, according to one embodiment.

FIG. 1 illustrates an example computing environment 100 that provides a label transformation service for networked devices, according to one embodiment. As shown, the computing environment 100 includes an Internet of Things (IoT) device 105, a mobile device 110, and a cloud computing platform 120, each interconnect via a network 125 (e.g., the Internet).

As shown, the IoT device 105 includes an application 107, a label repository 108, and a configuration 109. Illustratively, the IoT device 105 receives input items 106. In one embodiment, the IoT device 105 represents an IoT-enabled smart appliance. As a reference example, the IoT device 105 is an IoT-enabled washing machine, and the input items 106 represent a variety of clothing items that are loaded into the machine, such as shirts, pants, undergarments, and the like.

In one embodiment, the application 107 performs data collection and exchange functions relating to the performance of the IoT device 105 and to the input items 106. For instance, the IoT device 105 may include a number of scanners for collecting information regarding the input items 106. For example, the IoT device 105 may include a RFID reader that collects RFID tag data from input items 106 that include RFID tags. The IoT device 105 may store such data into the label repository 108. The label repository 108 allows the IoT device 105 to cache previously processed item data and quickly retrieve the item data when needed (e.g., with subsequent washings of the particular piece of clothing) and also to build a history of items processed by the IoT device 105.

In one embodiment, the application 107 may receive and transmit data with a cloud computing platform, e.g., the platform 120. As shown, the platform 120 includes a computing server 115 and normalized label data 119. The computing server 115 itself includes an assistant service 117. As will be further described below, the assistant service 117 translates input item 106 labels that may be unrecognizable to the IoT device 105, such that the IoT device 105 can properly process a given input item 106. An example where the IoT device 105 might use the assistant service 117 would be in the event that a given input item 106 includes a label that was printed for another country that has label standards differing from label standards for those normally printed for the country of use by the IoT device 105 (e.g., the IoT device 105 is configured to process labels printed according to United States standards but not typically printed according to China standards). Such labels may be printed in a different language, may use different units, may use different symbols, etc.

The assistant service 117 may maintain a database of label data collected from a variety of sources, such as manufacturer databases, platform and device users, and online databases. Once collected, the assistant service 117 extracts the data from a given label and determines information that maps to a given attribute, such as an item identifier, clothing type, country of origin, care instructions, etc. The assistant service 117 may then generate a separate entry including the extracted data into a normalized object that the assistant service 117 may use for further processing. For instance, to do so, the assistant service may generate a database entry having fields corresponding to each attribute and thereafter populate the extracted data into corresponding fields. As another example, the assistant service may maintain a mapping table that maps each of the attributes to a standardized field.

In one embodiment, the assistant service 117 provides an application programming interface (API) that the application 107 may use to send requests and commands to the assistant service 117. The application 107 may also communicate via a common API with the mobile device 110 via an assistant app 111. The assistant app 111 may register profiles 113 relating to the users of the IoT device 105 as well as the IoT device 105 itself with the assistant service 117. For instance, user profiles of the profiles 113 include information describing a user or user group (e.g., a collection of users in a household) for a given device. The user profiles may include identifying information of the user, input items 106 processed by the IoT device 105 for the user, user location, language preference settings, usage settings, and the like. The device profiles of the profiles 113 include a device identifier, type, version, usage history, and the like. The assistant app 111 may also allow a user to modify the configuration 109 of the IoT device 105, such as default settings of the IoT device 105.

Figure 2:
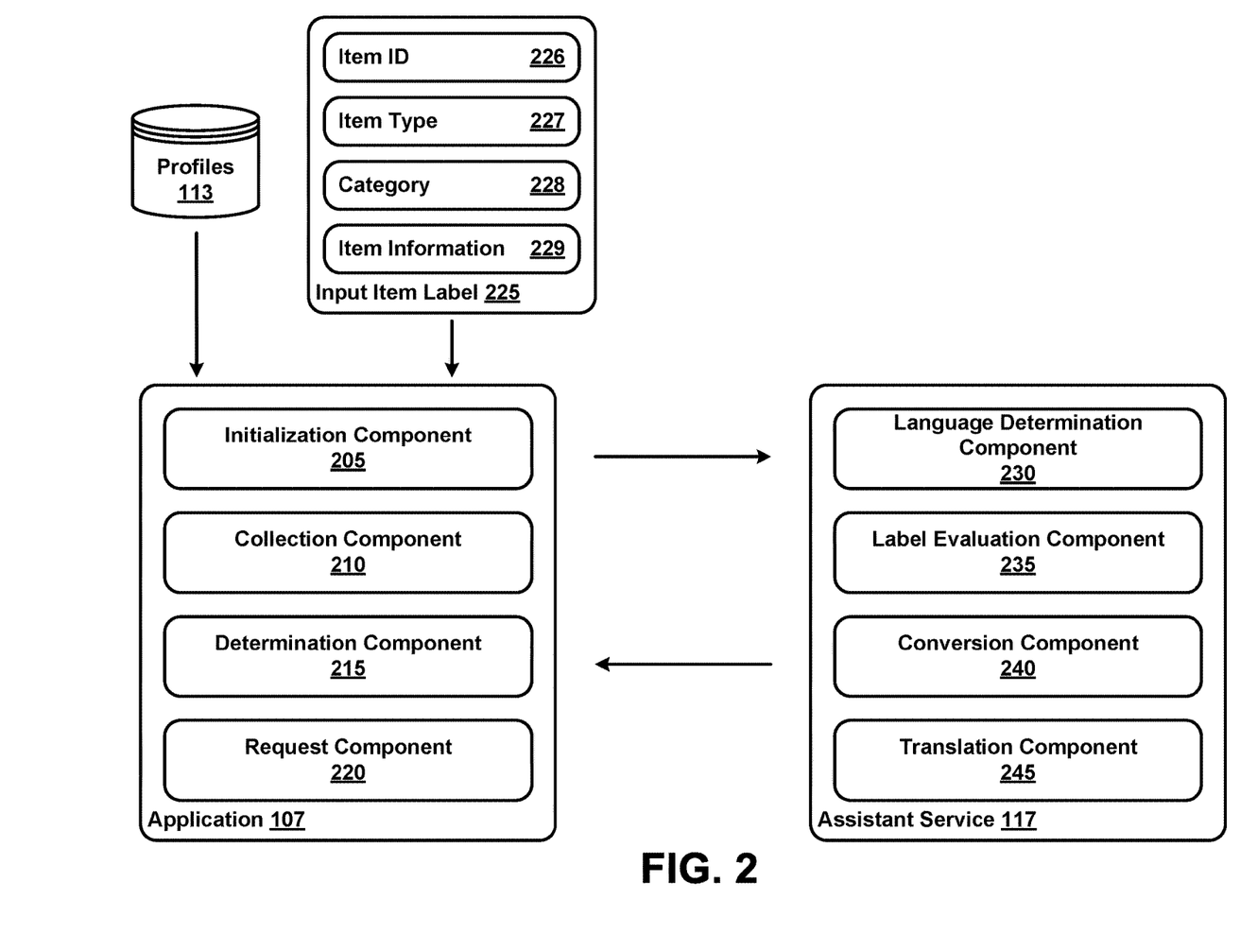
FIG. 2 further illustrates the assistant service and the Internet of Things (IoT) device application described relative to FIG. 1, according to one embodiment.

FIG. 2 further illustrates the assistant service 117 and the application 107, according to one embodiment. As shown, the application 107 includes an initialization component 205, a collection component 210, a determination component 215, and a request component 220. As shown, the assistant service 117 includes a language determination component 230, a label evaluation component 235, a conversion component 240, and a translation component 245.

Illustratively, the application 107 may receive profile 113 data (e.g., from the assistant app 111). At start-up of the IoT device 105, the initialization component 205 may retrieve a variety of information from the profiles, such as a user identifier, a user location, and a device identifier. Further, when a user inserts an input item 106 (e.g., an article of clothing) into the IoT device 105, sensors in the IoT device itself may scan an input item label 225 from the input item 106 and send the scanned raw data to the application 107. The collection component 210 may parse the scanned data for information such as an item ID 226, an item type 227 (e.g., whether the item is a shirt, undergarment, other, etc.), a category 228 (e.g., information about the item group), and item information 229 (e.g., a string describing care instructions, symbol information, etc.).

The determination component 215 may evaluate the collected data to identify instructions on how to process the input item 106. For example, the determination component 215 may evaluate the item information 229 to determine certain care instructions, such as a temperature for which to treat the input item. However, in some cases, the collection component 210 and the determination component 215 may be unable to properly identify the content of a label. An example case may be where the label itself is formatted in settings that differ from a default or user-defined language setting or encoding setting according to the profile. In such cases, the collection component 210 may forward the input item label 225 to the request component 220. For example, the collection component 210 may send identified data as well as an image scan of the input item label 225, e.g., if the IoT device 105 provides a camera sensor, to the request component 220.

The request component 220 receives the input item label 225 information (and image scan) and generates a request using an API associated with the assistant service 117. The request includes the information relating to the input item label 225. Further, the request component 220 may store input item label 225 information in a local data store to maintain a usage history as well as for machine learning purposes. For example, the determination component 215 may create one or more machine learning model using previously stored label data to learn patterns associated with particular input item labels (or the input items themselves, as scanned by the IoT device 105 using some sensor). The determination component 215 may then use the machine learning model (e.g., in addition to sending a translation request to the assistant service 117) to score stored label attributes based on the likelihood that those attributes should be associated with the corresponding input item. In one embodiment, the determination component 215 may generate a recommendation based on a the highest scores in each attribute and correlate and present care recommendations to the assistant app 111, where a user may decide whether to act on the recommendations (e.g., by adjusting settings of the IoT device 105 used to process the input item 106 based on the recommendations).

The assistant service 117 receives label translation requests from a given IoT device 105 via the application 107. The assistant service 117 may parse the request to identify the user ID and device ID to correlate the IDs with a stored profile. The language determination component 230 evaluates the stored profile to determine user-defined language settings. Further, the language determination component 230 may also determine, from the stored profile, encoding settings (e.g., whether the IoT device 105 generally presents instructions in UTF-8 encoding).

The label evaluation component 235 extracts the label information from the label translation request to determine any identifiable information from the label. For instance, the label evaluation component 215 may identify the language in which the item information 229. Further, the label evaluation component 215 may also evaluate any symbols provided in an image of the input item label to determine symbols. Further still, the label evaluation component 215 also determines whether an underlying string of the item information 229 is formatted properly for processing by the translation component 245, such as whether the item information 229 string is formatted in a specified code set. The conversion component 240 is configured to convert improperly formatted item information 229 to a string that can be processed by the translation component 245.

The translation component 245 determines a standardized entry for the input item label based on the provided input item label and based on mappings between previously scanned labels to normalized data. The translation component 245 may first convert the input item label to the standardized entry using the mappings. The translation component 245 may then convert the standardized entry to the user-specified language and encoding based on the mappings. Once converted, the assistant service 117 sends the translation to the IoT device 105.

Figure 3:
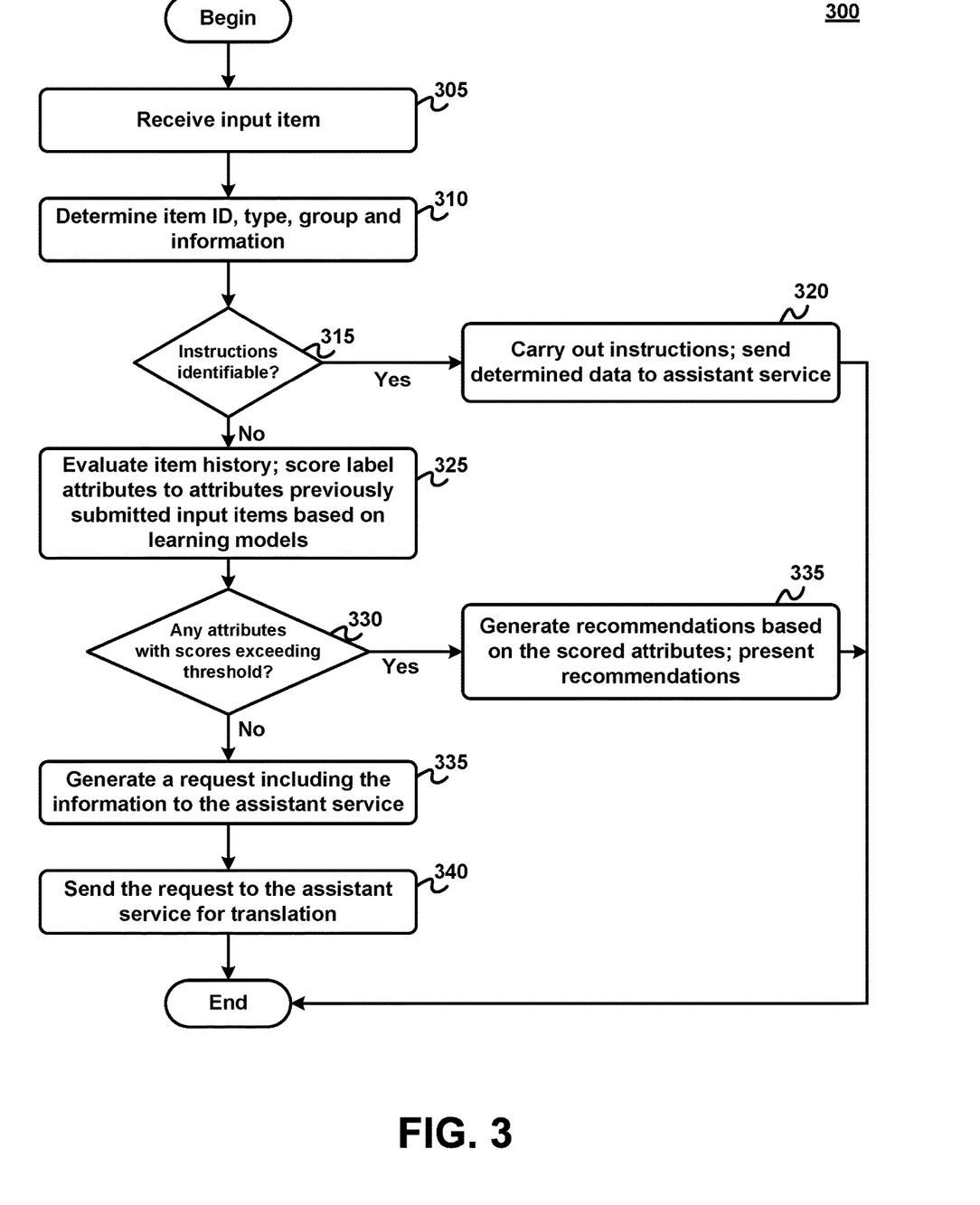
FIG. 3 illustrates a method for processing an input item by an IoT device, according to one embodiment.

FIG. 3 illustrates a method 300 for processing an input item by an IoT device, according to one embodiment. In this particular example, assume that the IoT device is an IoT-enabled washing machine that receives clothing items for processing. As shown, the method 300 begins at step 305, where the IoT device 105 receives an input item. The IoT device 105 may scan the label, e.g., using a camera or RFID reader, and send the label to the collection component 210. At step 310, the collection component 210 parses the label and determines an item ID, item type, item group, and information from the label.

At step 315, the determination component 215 evaluates whether the label instructions are identifiable based on the output of the collection component 210. If so, then at step 320, the IoT device 105 carries out the identified instructions (e.g., setting the temperature according to the instructions relative to instructions provided with other clothing items in the load). Further, the application 107 may store the label information in the label repository 108 for retrieval in subsequent processes (or for refining machine learning models). Further still, the application 107 may send the label information to the assistant service 117. In turn, the assistant service 117 may standardize the label and store mappings between the standardized label and the received label in label data 119.

Otherwise, at step 325, the determination component 215 evaluates the item history in the label repository 108 and learning models generated by the application 107. Doing so allows the determination component 215 to score candidates to corresponding label attributes based on patterns identified from the label in the learning models. Once the candidate attributes are scored, then at step 330, the determination component 215 determines whether any attributes have scores exceeding a specified threshold. If so, then at step 334, the determination component 215 generates recommendations based on the scored attributes and presents the recommendations for a user of the IoT device 105 (e.g., via the assistant app 111). An example recommendation can include attributes having the top scores for the respective category.

If one or more attributes do not have scores that exceed the threshold, then at step 335, the request component 220 generates a request that includes the input item label. At step 340, the request component 220 sends the request to the assistant service 117 for translation.

Figure 4:
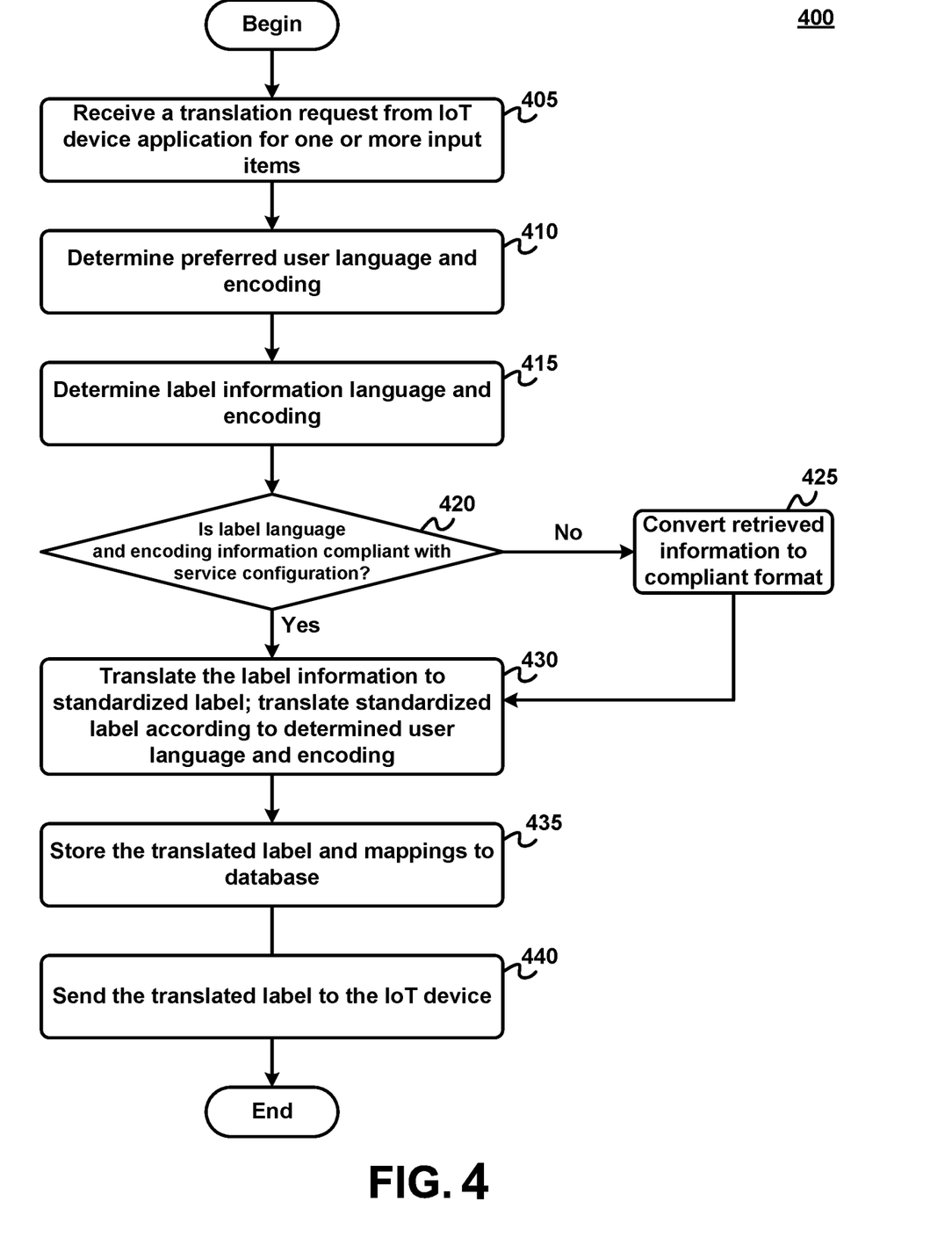
FIG. 4 illustrates a method for translating a label of an input item by an assistant service, according to one embodiment.

FIG. 4 illustrates a method 400 for translating a label of an input item by an assistant service, according to one embodiment. As shown, method 400 begins at step 405, where the assistant service 117 receives a request from the application 107 to translate one or more labels each corresponding to a given input item. The request includes identifying information of the device, user(s), label data (e.g., a scanned image of the label, data discernable by the IoT device 105, etc.), and the like. The request may also include information specifying a preferred language and encoding to which the label should be translated. At step 410, the language determination component 230 determines a preferred user language and encoding. As stated, the preferred language and encoding may be obtained from the request. Further, the language determination component 230 may evaluate a user profile associated with the request to identify a specified preference of a user language and encoding. For example, the user profile may specify a language preference of English and an encoding preference of UTF-8.

At step 415, the label evaluation component 235 determines a language and encoding of the label provided in the request. For example, to do so, the label evaluation component 235 may perform optical character recognition (OCR) for various recognized languages on a scan of the image and match the recognized text to a given language. Additionally, the label evaluation component 235 may evaluate received label data (parsed by the application 107) provided in the request to determine a matching language and encoding. Yet another example includes evaluating the repository of label data 119 for similar labels and determining the language and encoding of those similar labels. Other examples include machine translation techniques used to identify a language used in the underlying label data.

At step 420, the conversion component 240 optionally determines whether the label language and encoding information format is compliant with the assistant service configuration. For example, the configuration may specify that the label information provided is encoded as a string literal, and the received label information is determined from an image. In such a case, at step 425, the conversion component 240 converts the retrieved information to a compliant format (e.g., a string).

At step 430, the translation component 245 translates the label provided in the request to a standardized label. For example, the translation component 245 may convert the item type provided in the label data to an identifier value that corresponds to a type used by the service assistant 117 for processing label data. The standardized label may also include a value that identifies the language and encoding that the label is printed as well as the string representing the label care information. Further, the translation component 245 translates the standardized label to the user-preferred language. To do so, the translation component 245 may use language translation techniques, natural language processing, and the like. The translation component 245 may also use language dictionary applications to do so.

At step 435, the translation component 245 stores the translated labels (i.e., the standardized label and the user-preferred language-translated label) and mappings to the original label to those labels to the repository of label data 119. At step 440, the translation component 245 sends the user-preferred language-translated label to the IoT device 105.

Figure 5:
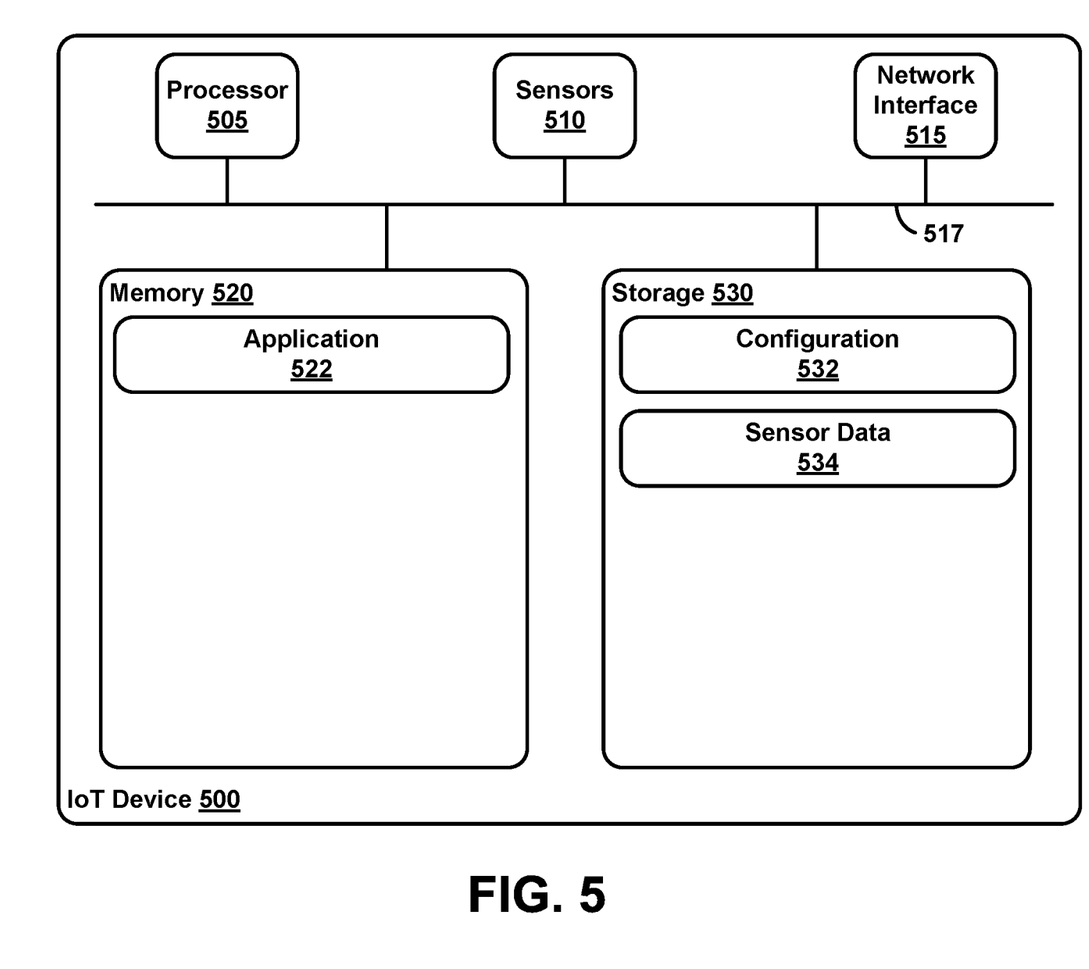
FIG. 5 illustrates an example IoT device configured to process an input item, according to one embodiment.

FIG. 5 illustrates an example IoT device 500 configured to process an input item, according to one embodiment. In one embodiment, the IoT device 500 represents an IoT-enabled smart appliance, such as a washing machine. As shown, the IoT device 500 includes a processor 505, one or more sensors 510, a network interface 515, a memory 520, and a storage 530, each interconnected via a bus 517. Of course, IoT devices will typically include a variety of additional hardware components.

The processor 505 retrieves and executes programming instructions stored in the memory 520. Similarly, the processor 505 stores and retrieves application data residing in the memory 520. The bus 517 transmits instructions and data between the processor 505, sensors 510, network interface 515, memory 520, and the storage 530. The processor 505 is included to be representative of a single CPU, multiple CPUs, a single CPU having multiple processing cores, and the like. The memory 520 is generally included to be representative of memory and storage on the IoT device 500.

The sensors 510 include a number of components for receiving or transmitting data. Further, the sensors 510 may be configured to scan label data from input items, such as tags on clothing items. For example, the sensors may include a camera that captures an image of a label and sends the label to be processed by an IoT application 522 maintained in the memory 520. As another example, the sensors 510 can include an RFID reader that scans RFID tags that can include label data, such as an identifier for the input item, type, and care information. Other examples include panels allowing a user to provide manual input and Bluetooth sensors for control by, e.g., a mobile device. The sensors 510 may also maintain scanned data in the storage 530 as sensor data 534. In addition, the application 522 may retrieve the sensor data 534 and forward the sensor data 534 for storage and analytics on the assistant service of the cloud platform.

Illustratively, the memory 520 includes the application 522. The storage 530 includes a device configuration 532 and the sensor data 534. The application 522 may receive a configuration, such as user and device profile data, from a mobile device app and store the user and device profile data within the device configuration 532. The application 522 may process input items according to the device configuration 532, such as user-specified parameters for temperature, timing, and the like. Further, the application 522 receives sensor data 534 and determines whether an input label received by a sensor 510 is formatted to be processed by the application 522, e.g., whether the input label is in a language and encoding recognizable to the application 522. If not, the application 522 may generate a request for the label transform assistant service on the cloud platform to format the label into a label that the application 522 can process, such as one in a language and encoding specified in the device configuration 532.

Figure 6:
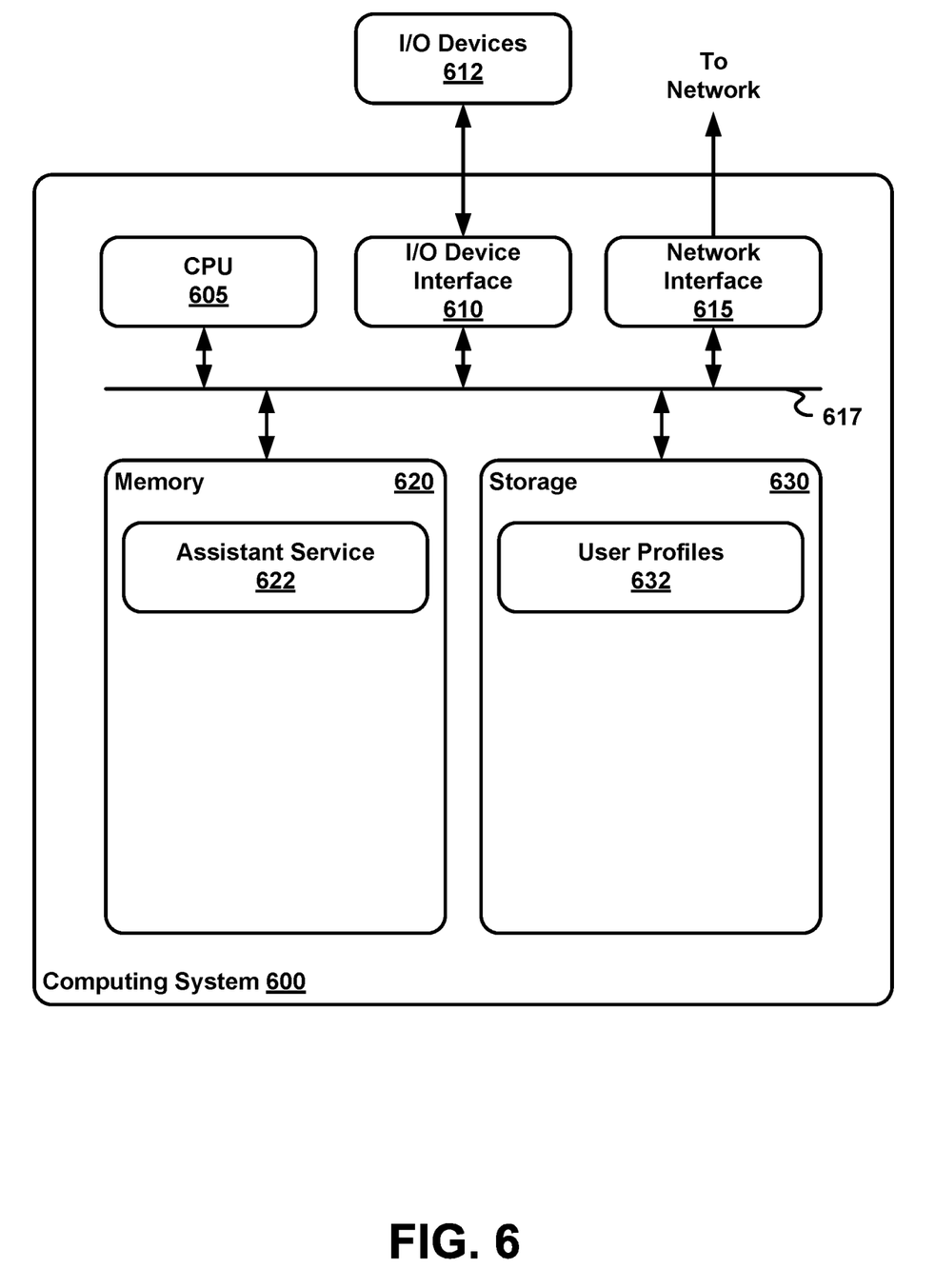
FIG. 6 illustrates an example computing system configured to normalize heterogeneous labels of input items, according to one embodiment.

FIG. 6 illustrates an example computing system 600 configured to normalize heterogeneous labels of input items, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, display, mouse devices, etc.) to the computing system 600. Further, in context of the present disclosure, the computing elements shown in the computing system 600 may correspond to a physical computing system (e.g., a system in an enterprise network) or a virtual computing instance (e.g., a server on a cloud platform).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a label transform assistant service 622. And storage 630 includes one or more user profiles 632. The assistant service 622 receives label translation requests from an IoT device (e.g., via an application executing on the IoT device). The assistant service 622 may format a label that is provided with a request such that attributes are assigned to normalized fields. For example, the assistant service 622 may correlate information scanned in the label using mappings of previously analyzed labels maintained on a cloud platform. Once formatted, the assistant service 622 translates the formatted label according to a specified language and encoding (e.g., provided by a user profile 632 associated with a user of the requesting IoT device). The assistant service 622 then sends the translated label to the requesting IoT device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects disclosed herein.

Aspects are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access the label transform assistant service or related data available in the cloud. For example, the assistant service could execute on a computing system in the cloud and translate a label received from an IoT device to a desired language and encoding. In such a case, the assistant service could store analyzed label data and mappings of label attributes to standardized fields at a storage location in the cloud. Doing so allows a user to access this information from any computing system attached to a network connected to the cloud (e.g., the Internet).

While the foregoing is directed to embodiments of the present disclosure, other and further embodiments may be devised without departing from the basic scope thereof, and the scope thereof is determined by the claims that follow.

What is claimed is:

1. A method comprising:
  receiving, by a device, an image of a label attached to a garment, wherein the label includes a plurality of care instructions for cleaning the garment;
  upon the device determining that a first instruction of the plurality of instructions cannot be interpreted for processing by the device, evaluating with a local machine learning model on the device an item history for the garment to generate a first score for a first replacement care instruction based on patterns identified from the label using the local machine learning model, wherein the first score indicates a likelihood that the first instruction corresponds to the first replacement care instruction, and wherein the first historical care instruction is appropriately formatted for processing by the device;
  upon determining that the first score does not exceed a predefined threshold, generating a request to translate the first instruction into an appropriate format for processing by the device, wherein the request includes the image and a target format;
  sending the request to a network service for translating the first instruction;
  receiving translated label content from the network service, wherein the translated label content comprises at least a translated first instruction; and
  processing, by the device, the item according to the translated label content.

2. The method of claim 1, further comprising:
  upon the device determining that a second instruction cannot be interpreted for processing by the device, evaluating with the local machine learning model on the device the item history for the garment to generate a second score for a second replacement instruction based on the patterns identified from the label using the local machine learning model, wherein the second score indicates a likelihood that the second instruction corresponds to the second replacement instruction, and wherein the second replacement instruction is appropriately formatted for processing by the device.

3. The method of claim 2, further comprising:

upon determining that the second score exceeds the predefined threshold, processing the garment according to the second replacement instruction.

4. The method of claim 1, wherein the device is an IoT-enabled washing machine.

5. The method of claim 1, wherein the label includes attributes for the garment that include one or more of an item type, item group, and item information.

6. The method of claim 1, wherein determining that the first instruction cannot be interpreted for processing by the device comprises:
   determining that a language and an encoding associated with first instruction do not match the target format.

7. A computer program product, comprising:
   a computer-readable storage medium storing instructions, which, when executed on a processor, perform an operation, comprising:
      receiving, by a device, an image of a label attached to a garment, wherein the label includes a plurality of care instructions for cleaning the garment;
      upon the device determining that a first instruction of the plurality of instructions cannot be interpreted for processing by the device, evaluating with a local machine learning model on the device an item history for the garment to generate a first score for a first replacement care instruction based on patterns identified from the label using the local machine learning model, wherein the first score indicates a likelihood that the first instruction corresponds to the first replacement care instruction, and wherein the first historical care instruction is appropriately formatted for processing by the device;
      upon determining that the first score does not exceed a predefined threshold, generating a request to translate the first instruction into an appropriate format for processing by the device, wherein the request includes the image and a target format;
      sending the request to a network service for translating the first instruction;
      receiving translated label content from the network service, wherein the translated label content comprises at least a translated first instruction; and
      processing, by the device, the item according to the translated label content.

8. The computer program product of claim 7, wherein the operation further comprises:
   upon the device determining that a second instruction cannot be interpreted for processing by the device, evaluating with the local machine learning model on the device the item history for the garment to generate a second score for a second replacement instruction based on the patterns identified from the label using the local machine learning model, wherein the second score indicates a likelihood that the second instruction corresponds to the second replacement instruction, and wherein the second replacement instruction is appropriately formatted for processing by the device.

9. The computer program product of claim 8, wherein the operation further comprises:
   upon determining that the second score exceeds the predefined threshold, processing the garment according to the second replacement instruction.

10. The computer program product of claim 7, wherein the device is an IoT-enabled washing machine.

11. The computer program product of claim 7, wherein label include attributes of the garment that include one or more of an item type, item group, and item information.

12. The computer program product of claim 7, wherein determining that the first instruction cannot be interpreted for processing by the device comprises:
    determining that a language and an encoding associated with the first instruction do not match the target format.

13. A system, comprising:
    a processor; and
    a memory storing program code, which, when executed on the processor, performs an operation, comprising:
       receiving, by a device, an image of a label attached to a garment, wherein the label includes a plurality of care instructions for cleaning the garment;
       upon the device determining that a first instruction of the plurality of instructions cannot be interpreted for processing by the device, evaluating with a local machine learning model on the device an item history for the garment to generate a first score for a first replacement care instruction based on patterns identified from the label using the local machine learning model, wherein the first score indicates a likelihood that the first instruction corresponds to the first replacement care instruction, and wherein the first historical care instruction is appropriately formatted for processing by the device;
       upon determining that the first score does not exceed a predefined threshold, generating a request to translate the first instruction into an appropriate format for processing by the device, wherein the request includes the image and a target format;
       sending the request to a network service for translating the first instruction;
       receiving translated label content from the network service, wherein the translated label content comprises at least a translated first instruction; and
       processing, by the device, the item according to the translated label content.

14. The system of claim 13, wherein the operation further comprises:
    upon the device determining that a second instruction cannot be interpreted for processing by the device, evaluating with the local machine learning model on the device the item history for the garment to generate a second score for a second replacement instruction based on the patterns identified from the label using the local machine learning model, wherein the second score indicates a likelihood that the second instruction corresponds to the second replacement instruction, and wherein the second replacement instruction is appropriately formatted for processing by the device.

15. The system of claim 14, wherein the operation further comprises:
    upon determining that the second score exceeds the predefined threshold, processing the garment according to the second replacement instruction.

16. The system of claim 13, wherein the device is an IoT-enabled washing machine.

17. The system of claim 13, wherein the label includes attributes that describe the garment that include one or more of an item type, item group, and item information.

18. The method of claim 1, further comprising:
    upon receiving the translated label content from the network service, determining an appropriate action relating to processing the garment;
    outputting the appropriate action to a mobile device that is different from the device and the network service;
    receiving input from the mobile device; and processing the garment by the device according to the input from the mobile device.

19. The computer program product of claim 7, wherein the operation further comprises:
upon receiving the translated label content from the network service, determining an appropriate action relating to processing the garment;
outputting the appropriate action to a mobile device that is different from the device and the network service;
receiving input from the mobile device; and
processing the garment by the device according to the input from the mobile device.

20. The system of claim 13, wherein the operation further comprises:
upon receiving the translated label content from the network service, determining an appropriate action relating to processing the garment;
outputting the appropriate action to a mobile device that is different from the device and the network service;
receiving input from the mobile device; and
processing the garment by the device according to the input from the mobile device.

\* \* \* \* \*